United States Patent [19]

Cohen et al.

[11] Patent Number: 5,115,506
[45] Date of Patent: May 19, 1992

[54] METHOD AND APPARATUS FOR PREVENTING RECURSION JEOPARDY

[75] Inventors: Robert B. Cohen; Robert E. Garner, both of Austin, Tex.

[73] Assignee: Motorola, Inc., Schaumburg, Ill.

[21] Appl. No.: 461,587

[22] Filed: Jan. 5, 1990

[51] Int. Cl.⁵ .............................................. G06F 13/00
[52] U.S. Cl. ..................................... 395/725; 395/775
[58] Field of Search ................................ 364/200, 900

[56] References Cited

U.S. PATENT DOCUMENTS

| | | | |
|---|---|---|---|
| 3,858,182 | 12/1974 | Delagi et al. | 364/200 |
| 4,217,638 | 8/1980 | Namimoto et al. | 364/200 |
| 4,410,939 | 10/1983 | Kawakami | 364/200 |
| 4,434,461 | 2/1984 | Puhl | 364/200 |
| 4,812,967 | 4/1989 | Hirosawa | 364/200 |
| 4,905,196 | 2/1990 | Kirmann | 365/200 |

OTHER PUBLICATIONS

"A Programmer's View of the 80960 Architecture", S. McGeady, Intel Corp., Hillsboro, OR.

Primary Examiner—Dale M. Shaw
Assistant Examiner—Andrew Bodendorf
Attorney, Agent, or Firm—Jonathan P. Meyer

[57] ABSTRACT

A microprocessor including unprime registers for use during normal operation, prime registers for use during interrupts, a normal register set for use during normal operation and conventional interrupt operations, an alternate register set for use during fast interrupt operations, and a memory stack. Three status bits are used to indicate that one or more fast interrupts have been initiated but not completed, that a fast interrupt is occurring but there are no other fast interrupts being processed, and that the CPU is currently processing a fast interrupt. These status bits indicate if there is a recursion jeopardy and are used to control the flow of information between the normal and alternate register sets and the memory stack in order to prevent recursion.

23 Claims, 4 Drawing Sheets

METHOD AND APPARATUS FOR PREVENTING RECURSION JEOPARDY

FIELD OF THE INVENTION

The present invention relates, in general, to a method and apparatus for preventing recursion jeopardy. More particularly, the invention relates to a method and apparatus for handling exception processing, such as interrupts, and for preventing recursion jeopardy in microprocessors.

BACKGROUND OF THE INVENTION

In apparatus such as microprocessors and other digital processors, a central processing unit (CPU) is utilized for the processing operations. The CPU includes an on-chip register set which is utilized by the CPU during both normal operation and exception processing, in a manner well known to those skilled in the art. Whenever any prior operation is interrupted by an exception process such as an interrupt operation, there is a recursion jeopardy problem because the interrupt processing program will use the same registers and may change some of the values therein. The conventional solution to the problem is to save in a memory (also referred to as "stacking") the current values of some or all of the registers prior to beginning the processing of the interrupt and reading those saved values back into the registers from memory (also referred to as "unstacking") when interrupt processing is complete. This solution is time consuming and requires relatively extensive software support. However, this solution is theoretically capable of handling an unlimited number of "nested" interrupts (i.e.: interrupts which interrupt other interrupt programs).

Some microprocessors provide several, alternate on-chip register sets (also known as register banks) for use during interrupt processing. An interrupt program simply uses a different set of registers than was being used by the interrupted program, thus avoiding the need to stack the register contents. This approach is very costly in terms of the silicon area when the problem of nested interrupts is considered. Duplicating all the necessary registers in order to permit a reasonable number of nested interrupts may well require an unreasonable number of registers.

Further, some mechanism must be provided, even in a machine having multiple register banks, to determine when all banks are in use (when recurssion jeopardy exists) and to provide some solution to the problem.

SUMMARY OF THE INVENTION

It is an object of the present invention to provide a method and apparatus for preventing recursion jeopardy in microprocessors and the like.

It is a further object of the present invention to provide apparatus for indicating recursion jeopardy in microprocessors and the like.

It is a further object of the present invention to provide for an unlimited number of nested interrupts utilizing a limited number of on-chip registers.

These and other objects are realized in a processor system for processing digital data including a first register bank, a second register bank, a first status bit, a second status bit, and interrupt logic which receives an interrupt signal. Depending on whether the received interrupt signal is of a first or second type and depending on the value of the two status bits, the interrupt logic determines whether to perform a bank switching operation, determines whether to perform a stacking operation, and also selects new values for the first and second status bits.

These and other objects and advantages of the present invention will be apparent to one skilled in the art from the detailed description below.

DESCRIPTION OF THE PREFERRED EMBODIMENT

The terms "set" and "clear" will be used when referring to the rendering of a status bit or similar apparatus into its logically true or logically false state, respectively.

Figure 1A:
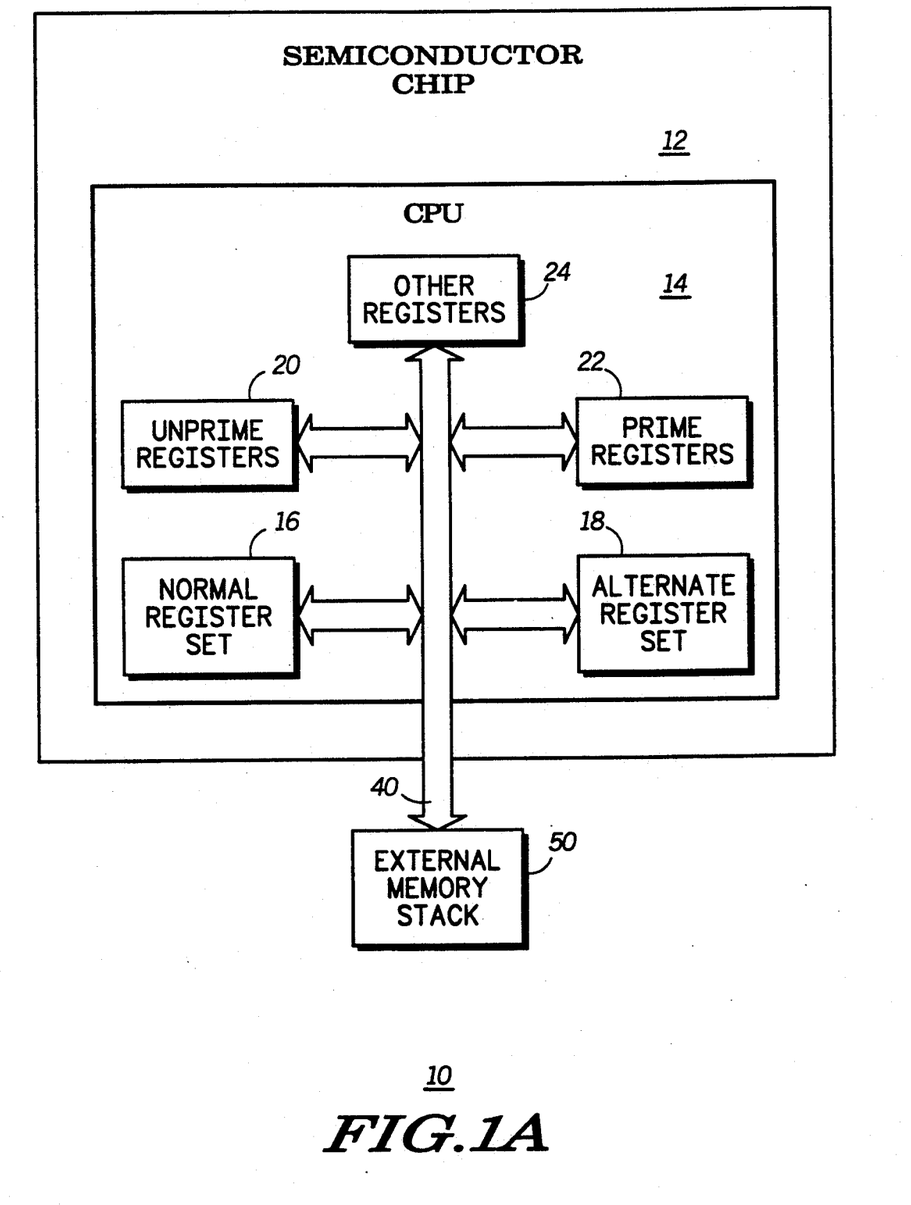
FIG. 1A is a simplified functional block diagram of a digital data processor system which comprises a particular embodiment of the present invention.

Referring to FIG. 1A, a digital data processor system 10 is illustrated which in this simplified form comprises a semiconductor chip 12 having a CPU 14 containing a normal register set 16, an alternate register set 18, unprime registers 20, prime registers 22, and other registers 24. The CPU is connected to a bus 40 which is also connected to an off-chip memory stack 50. It will of course be understood that in some specific processor systems the memory stack 50 and the bus 40 may be included on-chip and the off-chip memory stack is illustrated for example only. It will also be understood that memory stack 50 requires bus 40 operation to be accessed and that accessing register sets is a high speed operation while accessing the memory stack across the bus 40 is a relatively slow operation. Therefore, it is desirable to utilize the register sets as much as possible during processing and to utilize the memory stack only when essential.

In digital data processor system 10 there are multiple interrupt levels which determine whether a given interrupt has priority over any other interrupt. Thus an interrupt with a higher priority will get processed more quickly than an interrupt with a lower priority which must wait for processing. The concept of interrupt priority is well known to those skilled in the art. Although this particular embodiment deals with the recursion joepardy that can occur when multiple interrupts try to use the same register resources, it should be understood that the disclosed invention could be used to prevent recursion jeopardy in any storage means on any type of integrated circuit.

Digital data processor system 10 utilized two types of interrupts: conventional interrupts and fast interrupts. The type of interrupt determines whether the interrupt processing routine will default to using the normal register set 16 or the alternate register set 18. Conventional interrupts default to using the normal register set 16 and fast interrupts default to using the alternate register set 18. The interrupt type does not affect the priority scheme. A conventional interrupt will interrupt normal operation or any other interrupt which has a lower priority level. Likewise, a fast interrupt will interrupt normal operation or any other interrupt which has a lower priority level.

Figure 1B:
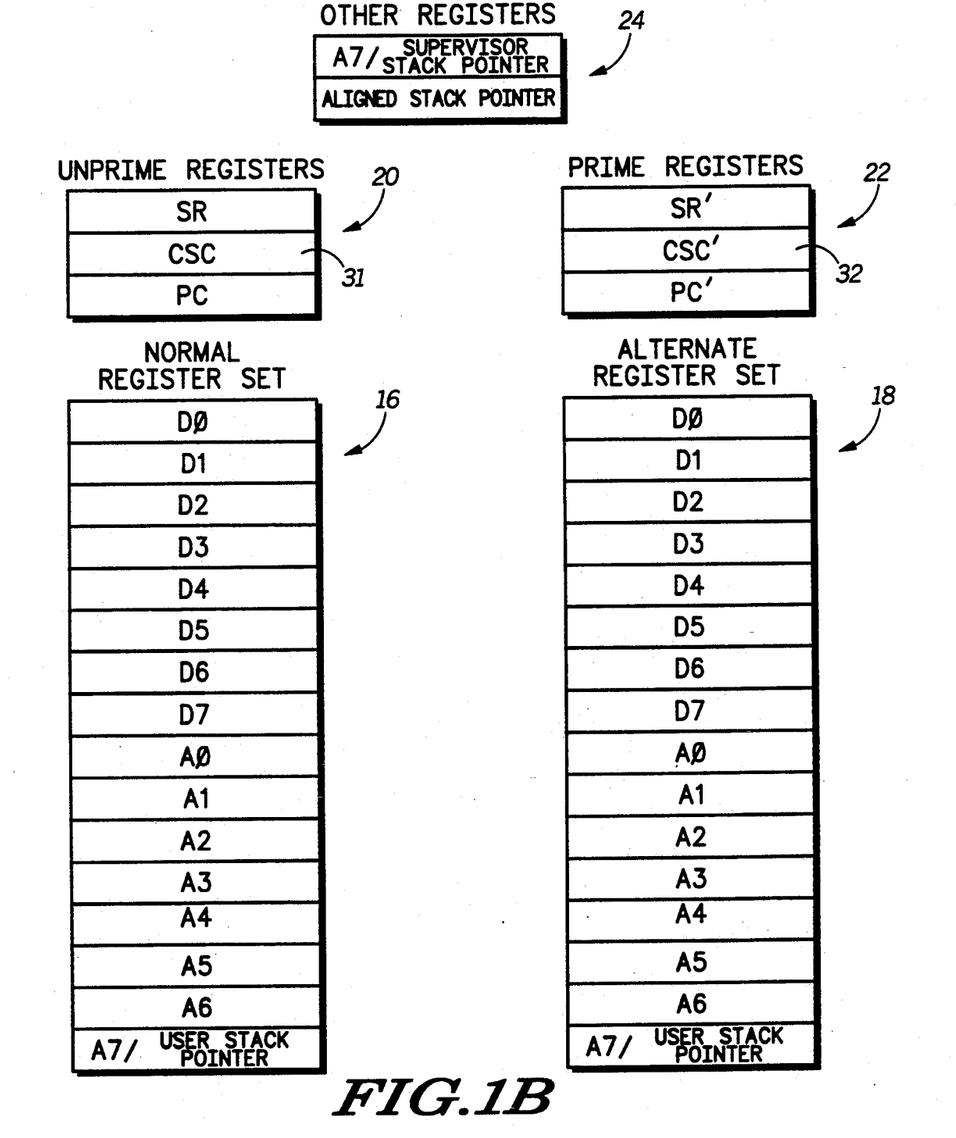
FIG. 1B is a diagram of registers contained within the digital data processor system of FIG. 1A.

Referring to FIG. 1B, the normal register set 16 consists of eight data registers (D0-D7) and eight address registers (A0-A7), with the last address register A7 also acting as a user stack pointer. The alternate register set 18 duplicates the registers in the normal register set 16. The CPU will access and use either the normal register set 16 or the alternate register set 18, but never both register sets at the same time. From the viewpoint of a user writing software for the CPU, which register set is being used is relatively transparent. That is, the user may simply direct that a particular instruction use data register D2 as a source of an operand or destination of an operation. Hardware will determine whether the D2 register of the normal set 16 or the D2 register of the alternate set 18 will be accessed. As is familiar to users of any of Motorola's 68000-family of microprocessors (e.g.: MC68000, MC68010, MC68020 and MC68030, all available from Motorola, Inc. of Austin, Tex.), the CPU operates in either a user mode or a supervisor mode. The mode of operation is controlled by a bit located in the status register SR.

Figure 1C:
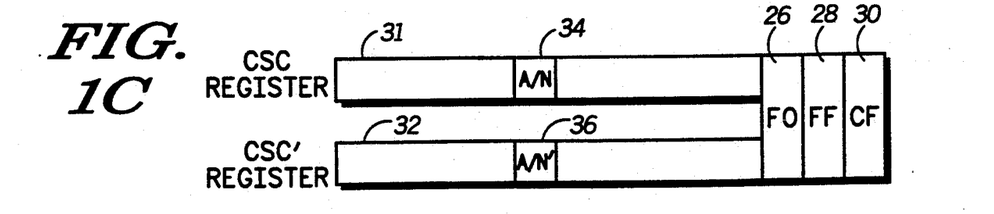
FIG. 1C is a diagram of bits contained within two particular registers show in FIG. 1B.

Again referring to FIG. 1B, the unprime registers 20 consist of a status register (SR), a context switch control register (CSC) 31, and a program counter (PC). Referring to FIG.1C, the prime registers 22 duplicate the unprime registers 20 with the exception of the FO (Fast Interrupt Ocurred) status bit 26, the FF (First Fast Interrupt) status bit 28, and the CF (Current Fast Interrupt) status bit 30 in the CSC register 31. The FO status bit 26, the FF status bit 28, and the CF status bit, are not duplicated. The CPU will access and use either the unprime registers 20 or the prime registers 22, but never both register sets at the same time. An access to either the CSC register 31 or the CSC' register 32 will result in the same FO status bit 26, FF status bit 28, and CF status bit 30 being accessed. The A/N bit 34, however, is duplicated. The identity and use of these various bits is described below.

Referring to FIG. 1C, the A/N bit 34 is located in CSC register 31. A duplicate A/N' bit 36 is located in CSC' register 32. When the CPU 14 is using unprime registers 20, only the A/N bit 34 can be accessed. Similarly, when the CPU is using the prime registers 22, only the A/N' bit 36 can be accessed. Neither the A/N bit 34 nor the A/N' bit 36 can be accessed by software in user mode, however, the CPU 14 hardware can always read the status of these bits. In this particular embodiment, either the A/N bit 34 or the A/N' bit 36 can be accessed as a control bit in supervisor mode to force the CPU to use the corresponding set of normal registers 16 or alternate registers 18. This is an additional feature that is not required to practice the present invention. So for the sake of clarity, it will be assumed in the remaining explanation that the A/N bit 34 and the A/N' bit 36 are being used as read-only status bits by the CPU 14 hardware.

Either the A/N bit 34 or the A/N' bit 36 indicates whether the CPU 14 is presently using the normal register set 16 or the alternate register set 18. A "zero" value indicates that the alternate register set 18 is being used and a "one" value indicates that the normal register set 16 is being used. If the A/N bit 34 or the A/N' bit 36 is stacked along with information from either the normal register set 16 or the alternate register set 18, the CPU 14 hardware or a software routine can use the A/N bit 34 or the A/N' bit 36 when it unstacks to determine whether the information should be restored to the normal register set 16 or to the alternate register set 18.

The unprime registers 20 are only used when no fast interrupt has begun processing. Once a fast interrupt is received and begins processing, the prime registers 22 are used exclusively for the first fast interrupt and any new incoming fast or conventional interrupts. The CPU 14 does not return to using the unprime registers 20 until the first fast interrupt has been completed and there are no more fast interrupts to process. Also, every time that a higher priority interrupt interrupts the processing of a lower priority interrupt, the prime registers 22, which contain the A/N' bit 36, the FO status bit 26, the FF status bit 28, and the CF status bit 30, are automatically stacked to the memory stack 50 by the CPU 14 hardware. This stacking is always required because the prime registers 22 contain information that is necessary to complete the processing of the lower priority interrupt.

In this particular embodiment, there is an important distinction between the unprime 20 and prime 22 registers as compared to the normal 16 and alternate 18 register sets. The CPU 14 uses the prime registers 22 during all interrupt processing once a fast interrupt has been received, whereas the CPU 14 can use, depending on the type of interrupt, either the normal register set 16 or the alternate register set 18 during interrupt processing. This distinction was made for convenience in this particular embodiment. Because the registers comprising the unprime 20 and prime 22 registers are registers containing information that must be stacked any time a new higher priority interrupt is received, the CPU 14 in this particular embodiment automatically stacks these registers when there is recursion jeopardy in order to save software processing time. The normal 16 and alternate 18 register sets, on the other hand, are data and address registers that only require a particular register to be stacked if the new higher priority interrupt is going to alter the information in that particular register. Thus the stacking of any registers in the normal 16 and alternate 18 register sets is left to the programmer using software control so that there is no processing time wasted on unnecessary stacking.

Referring to FIG. 1B, the other registers 24 consist of registers which are not duplicated and can be used by the CPU 14 at any time regardless of whether or not the CPU 14 is carrying out normal operations or interrupt processing. Because there is no duplication, anytime that an interrupt routine will affect the data in any of these other registers 24, the interrupt routine must stack those registers that it is going to affect. If there is the possibility that one software routine using one or more of the other registers 24 may interrupt another software routine using one or more of the other registers 24, then there is always the possibility of recursion jeopardy. There are no status bits or control circuitry to aid in handling recursion jeopardy problems for the other registers 24. Because there is no way to determine whether or not recursion jeopardy actually exists, each software routine using the other registers 24 must always assume that there is recursion jeopardy and must stack any of the other registers 24 that the interrupting software routine will affect. In this particular embodiment, the other registers 24 are ones that are only used when the CPU 14 is in supervisor mode. Other registers 24 are registers that will rarely need to be stacked in most applications, and thus there was no reason to waste silicon area duplicating the registers and no reason to waste processing time having the CPU automatically stack these registers.

It is apparent that there are three "classes" of register described: those which are duplicated and always stacked automatically (the unprime and prime registers), those which are duplicated but stacked only as necessary and under software control (the normal and alternate registers) and those which are not duplicated and are stacked only as necessary and under software control (the other registers). It is to be understood that there are many different register configurations that could employ the present invention. The register configuration described in this specification is just one configuration out of many possible register configurations that could be used. For instance, the description above could be readily extended to the case of multiple register banks. In this case, there could be several nested interrupts before recursion jeopardy occurs. The principles, however, remain the same. Also, it is to be understood that it is possible to use either software instructions or CPU 14 hardware to stack and unstack information from memory stack 50.

Referring to FIG. 1C, the FO status bit 26, the FF status bit 28, and the CF status bit 30 are all read-only status bits which are automatically set by operation of CPU 14. A first of the three status bits, FO (Fast Interrupt Occurred) 26, is set if one or more fast interrupts have been initiated but have not yet been completed. This bit indicates a recursion jeopardy in the present system and remains set until cleared upon the completion of all current fast interrupt processing. A second of the three status bits, FF (First Fast Interrupt) 28, is set when a fast interrupt occurs and there are no other fast interrupts being processed (i.e. it is the first fast interrupt). It is cleared for all subsequent interrupts after the first fast interrupt. A third of the three status bits, CF (Current Fast Interrupt) 30, is set only while CPU 14 is in the fast interrupt mode of operation. The CF status bit 30 can be used by both hardware and software to determine whether the interrupt being processed is a conventional interrupt or a fast interrupt. Thus the three status bits, FO status bit 26, FF status bit 28, and CF status bit 30, generate and maintain information on the state of recursion jeopardy of normal register set 16, alternate register set 18, unprime registers 20, and prime registers 22. The status bits can be monitored by CPU 14 and utilized during programming to provide optimum use of normal register set 16, alternate register set 18, unprime registers 20, prime registers 22, and memory stack 50.

In the present embodiment wherein normal register set 16 is utilized for normal operation and conventional interrupts and alternate register set 18 is utilized for fast interrupts, there may be recursion jeopardy if one interrupt is interrupted by another interrupt, because the second interrupt may try to utilize the same register set as the first interrupt without saving the information in the registers. By providing status regarding the interrupts, software can be written: (1) to detect that information stored in part or all of a register set must be saved to the memory stack 50; (2) to detect that the previously stored information must be unstacked and restored to one or more registers; and (3) to detect what type of interrupt is currently being processed. There is also recursion jeopardy when a conventional interrupt is received during normal operation because the processing of the conventional interrupt will use the same normal register set 16 and the same unprime registers 20. There is no recursion jeopardy when a first fast interrupt is received because the first fast interrupt will cause the CPU 14 to switch from using the normal register set 16 to using the alternate register set 18 and to switch from using the unprime registers 20 to using the prime registers 22 for the first time.

In this particular embodiment, the CPU 14 hardware uses the FO status bit 26, the FF status bit 28, and the CF status bit 30 along with the interrupt type of a pending interrupt to determine whether to switch between the unprime registers 20 and the prime registers 22, or whether to stack the prime registers 22 and then use the prime registers 22. This determination could also be accomplished in software. In this particular embodiment, the CPU 14 switches to using the prime registers 22 when the first fast interrupt is received. If any additional fast or conventional interrupts are received before that first fast interrupt has finished processing, the CPU will continue to use the prime registers 22. The CPU 14 does not switch back to using the unprime registers 20 until all of the pending fast interrupt routines have finished processing.

CPU 14 hardware never stacks any of the registers in the normal register set 16 or the alternate register set 18. Any stacking of these registers that is required is left up to the user to perform in software. The CPU 14 hardware routine, however, does determine whether to switch between the unprime registers 20 and the prime registers 22 based upon whether the CPU 14 is in normal operation, processing a conventional interrupt, or processing a fast interrupt. Once again, the decision of whether to stack a set of registers or whether to switch to another set of registers could also have been accomplished using either software or CPU 14 hardware.

Because the normal register set 16 is utilized for normal operation as well as for conventional interrupts, information that might be corrupted must be stacked from the normal register set 16 as the first operation of the conventional interrupt handler routine. But because the alternate register set 18 is only utilized for fast interrupts, information does not have to be stacked from the alternate register set 18 for the first fast interrupt which is processed. However once a fast interrupt is being processed utilizing the alternate register set 18, there is recursion jeopardy because a fast interrupt with a higher priority might interrupt the present fast interrupt and thus try to use the same register set. Therefore, information that might be corrupted must always be stacked from the alternate register set 18 if a higher priority fast interrupt is received and there are already one or more fast interrupts for which processing has not been completed.

As previously stated, the FO status bit 26 indicates if the processing of one or more fast interrupts has been initiated but has not yet been completed. The FO status bit 26 remains set and is not cleared until the processing of all fast interrupts has been completed. The FO status bit 26 thus can be used to determine whether or not there is recursion jeopardy for the alternate register set 18 and the prime registers 22. Stacking of the alternate register set 18 and the prime registers 22 is required when there is both recursion jeopardy and when the incoming interrupt is a fast interrupt. It is optional whether the CPU circuitry itself stacks all or part of the register information or whether the stacking is left for the user to perform using software instructions.

The FF status bit 28 is set only for the "first" fast interrupt, which occurs only when the prior state of the FO status bit 26 is a cleared state indicating that there were no fast interrupts presently pending. Since the FO status bit 26 will also be set by the first fast interrupt which sets the FF status bit 28, any fast interrupt with a higher priority level which is initiated before the first fast interrupt is completed will cause a recursion jeopardy situation requiring that information from the first fast interrupt which is located in alternate register set 18 be stacked (i.e. transferred to memory stack 50) as the first operation of the interrupt handler routine. Information in the prime registers 22, which includes the FO status bit 26, the FF status bit 28, the CF status bit 30, and the A/N' bit 36, is also stacked. Upon terminating the second fast interrupt operation, the register and status bit information for the first fast interrupt operation will be unstacked (i.e. retrieved from memory stack 50) and the first fast interrupt operation will be resumed. The first fast interrupt will be the only fast interrupt for which the FF status bit 28 is set. During processing of all other fast interrupts, the FF status bit 28 will be cleared. Therefore, the FF status bit 28 can be used to determine whether or not there are any more fast interrupts which are pending and whether or not there is information from one or more fast interrupts remaining on the stack. It is optional whether the CPU 14 circuitry itself unstacks all or part of the register information or whether the unstacking is left for the user to perform using software instructions.

The CF status bit 30 is used to indicate that a fast interrupt is currently being processed. The CF status bit 30 is set when the CPU 14 is currently processing a fast interrupt and is cleared when the fast interrupt is completed or when a higher priority level of conventional interrupt has interrupted a fast interrupt and is currently being processed.

It will of course be understood by those skilled in the art that additional register sets can be provided on semiconductor chip 10 to reduce the requirement to save operations to memory stack 50. However, the problem is that regardless of the number of register sets provided, there may always be one more level of nested interrupts than the extra register sets can accommodate without stacking. It is seldom efficient to provide so many register sets that stacking is not required. If high levels of nesting occur infrequently it is generally much more efficient to provide the two on-chip register sets disclosed and utilize memory stack 50 during nesting. In this instance most of the overhead associated with saving to or restoring from memory stack 50 during interrupt operations will be eliminated, since information in normal register set 16 and/or alternate register set 18 would not need to be saved in memory stack 50 unless nesting occurs.

Expanding this idea to an "N" deep set of registers, the jeopardy for recursion will occur when there has been an "N" deep nesting of interrupts, such that an "N+1" interrupt in the nesting would require that the previous interrupt operation be saved in a memory stack. In this case the first status bit would indicate "at least N deep nested interrupts in process" (or a recursion hazard) and would indicate whether the CPU should switch to another register bank or whether all of the registers are in use and the CPU must do a more time consuming stacking procedure before using a register bank. The second status bit would indicate which interrupt was the "first interrupt" so that the CPU would know when there were no more interrupts pending. Additional status bits could be optionally used if there were multiple types of interrupts. For example, a third status bit could be used to indicate whether the CPU was currently processing a conventional or a fast interrupt. The manipulation of these bits will remain the same, such that for the first interrupt, the "first interrupt" status bit will be set, and upon the $N^{th}$ nesting, the "recursion hazard" status bit will be set. The "recursion hazard" status bit will continue to remain set as long as there are at least "N" deep nested interrupts in process. The "first interrupt" status bit will be cleared by any subsequent interrupts or by completion of the first interrupt which caused the setting of the "first interrupt" status bit.

Figure 2:
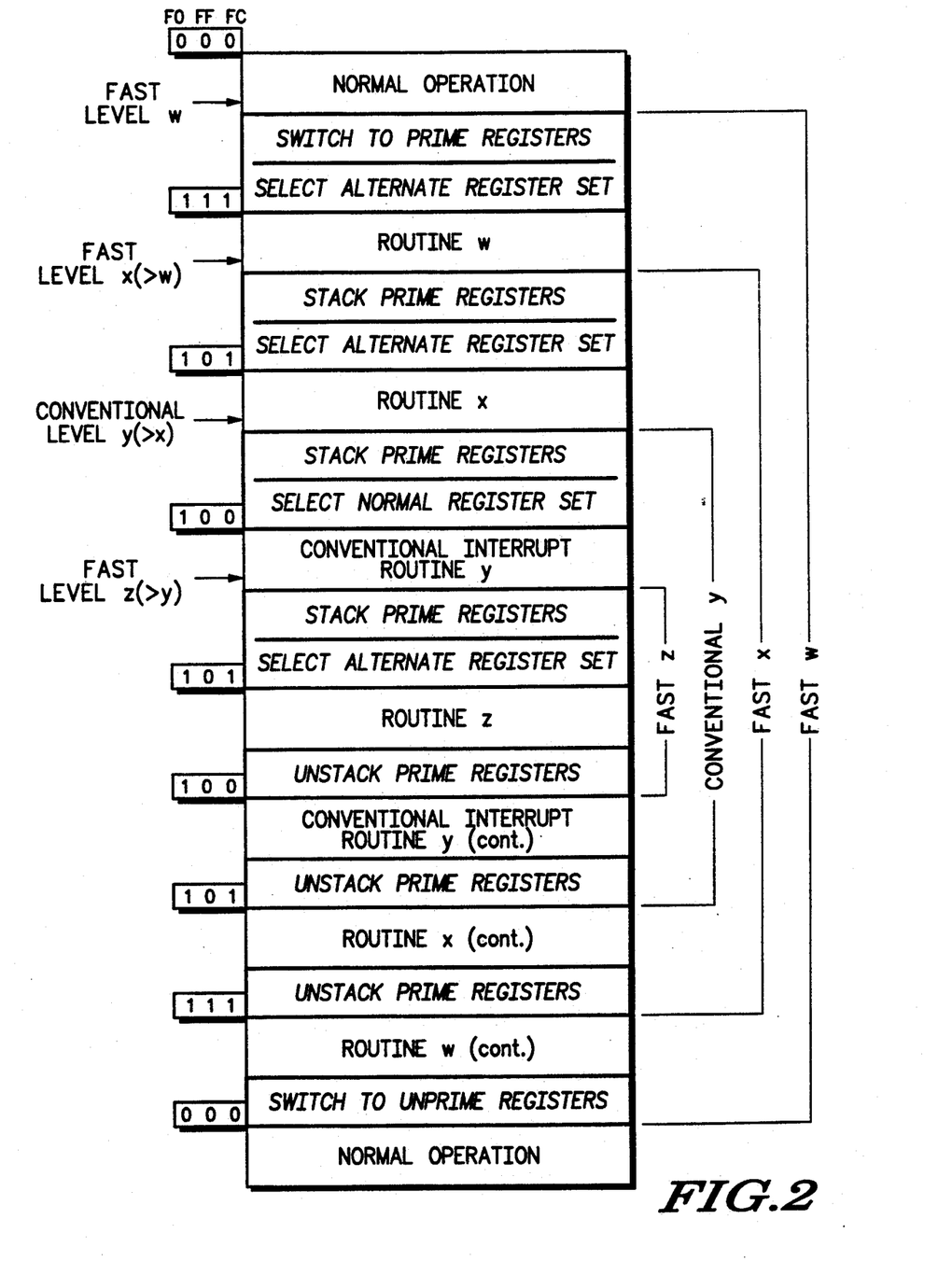
FIG. 2 is a flow chart illustrating an interrupt nesting example utilizing the present apparatus and method.

Referring specifically to FIG. 2, a flow chart for an interrupt nesting example is illustrated. In this example, normal operation is interrupted by a fast interrupt having a priority level "w". Because this is the first fast interrupt, the CPU 14 switches from using the unprime registers 20 to using the prime registers 22. Since alternate register set 18 is utilized for fast interrupt operations and there is presently no recursion jeopardy, the CPU 14 doesn't stack, but instead switches register banks and selects alternate register set 18 prior to the start of the level "w" fast interrupt. Also, since this is the first fast interrupt and since CPU 14 is currently in the fast interrupt mode, FO status bit 26, FF status bit 28, and CF status bit 30 are all set.

Before the level "w" fast interrupt operation can be completed, a fast interrupt having a priority level "x" (which is greater than the priority level w) is requested and subsequently initiated. Alternate register set 18 remains enabled because the incoming interrupt is a fast interrupt. The CPU 14 hardware stacks the information which is associated with the level "w" interrupt from the prime registers 22 to the memory stack 50. The user, in software, has the option of stacking from alternate register set 18 to memory stack 50 any information associated with the level "w" interrupt which might be corrupted by the new interrupt "x". CPU 14 can then start level "x" fast interrupt operation. FF status bit 28 is cleared, since CPU 14 is not processing the the "first fast interrupt" anymore. However, FO status bit 26 and CF status bit 30 remain set because a fast interrupt has been initiated but not completed and CPU 14 is currently processing a fast interrupt.

Before the level "x" fast interrupt operation can be completed, a conventional interrupt having a priority level "y" (which is greater than the priority level x) is requested. The CPU 14 hardware stacks the information which is associated with the level "x" interrupt from the prime registers 22 to the memory stack 50. The CPU switches from using the alternate register set 18 to using the normal register set 16 because the normal register set 16 is used for all conventional interrupts. The user, in software, has the option of stacking from normal register set 18 to memory stack 50 any information associated with the normal operation which might be corrupted by the new interrupt "y". With the initiation of the level "y" conventional interrupt, CF status bit 30 is cleared because CPU 14 is currently processing a conventional interrupt.

Before the level "y" conventional interrupt operation can be completed, a fast interrupt having a priority level "z" (which is greater than the priority level y) is requested. The CPU 14 hardware stacks the information which is associated with the level "y" interrupt from the prime registers 22 to the memory stack 50. The CPU 14 switches from using the normal register set 16 to using the alternate register set 18 because the alternate register set 18 is used for all fast interrupts. The user, in software, has the option of stacking from alternate register set 18 to memory stack 50 any information associated with the level "x" interrupt which might be corrupted by the new interrupt "z". CPU 14 initiates the level "z" fast interrupt operation and the CF status bit 30 is again set, since CPU 14 is currently processing a fast interrupt.

No additional interrupts are requested and CPU 14 is allowed to complete the level "z" fast interrupt operation. Note that if the user, in software, stacks any information associated with the level "x" fast interrupt operation at the beginning of the level "z" interrupt processing, that information associated with the level "x" fast interrupt operation must be unstacked and restored at the end of the level "z" interrupt processing. Once the level "z" fast interrupt operation has completed, the information associated with the level "y" conventional interrupt operation is unstacked from memory stack 50 and is loaded into prime registers 22. The CF status bit 30 can be used to determine whether a remaining interrupt is a conventional interrupt and should use the normal register set 16, or is a fast interrupt and should use the alternate register set 18. Since the unstacked CF status bit 30 indicates that the next interrupt is a conventional interrupt (level "y") and since the information for this operation is still in normal register set 16, CPU 14 enables normal register set 16 and continues the level "y" conventional interrupt operation.

Before the completion of the level "y" conventional interrupt, the user, in software, must unstack from memory stack 50 to the normal register set 16 any information associated with the normal operation which had been previously stacked. Once the level "y" conventional interrupt has completed, the information saved in memory stack 50 which is associated with the level "x" fast interrupt operation is transferred back to the prime registers 22. Because the unstacked value of the CF status bit 30 indicates that this remaining interrupt is a fast interrupt, the alternate register set 18, which contains information associated with the level "x" fast interrupt operation, is enabled and the level "x" fast interrupt operation is continued.

At the end of the level "x" interrupt routine, the user, in software, must unstack from memory stack 50 to the alternate register set 18 any information associated with the level "w" fast interrupt operation which had been previously stacked. Once the level "x" fast interrupt operation has completed, the information associated with the level "w" fast interrupt operation is unstacked from memory stack 50 and is loaded into prime registers 22. Since the unstacked CF status bit 30 indicates that the next interrupt is a fast interrupt (level "w") and since the information for this operation is already located in alternate register set 18, CPU 14 keeps alternate register set 18 enabled and continues the level "w" fast interrupt operation. Because the FF status bit 28 is set for the level "w" fast interrupt, it is known that this interrupt is the last remaining fast interrupt in process.

Once the processing of the level "w" first fast interrupt has completed, the CPU 14 switches back to using the unprime registers 20. The first fast interrupt operation does not have to do any stacking because it is always the first process to use both the alternate register set 18 and the prime registers 22. With the completion of the first fast interrupt operation, CPU 14 is free to return to normal operation. Normal register set 16 already contains the information associated with the normal operation and is simply enabled as CPU 14 resumes normal operation.

It should be noted that throughout the above described nesting procedure status bits FO 26, FF 28, and CF 30 were utilized to indicate the present status of CPU 14 and the progress of the nesting procedure. In addition, the correlation between the three status bits, the nesting procedure, and the contents of normal register set 16, alternate register set 18, unprime registers 20, prime registers 22, and memory stack 50 can be appreciated. Thus, it will be seen by those skilled in the art that the contents and operation of normal register set 16, alternate register set 18, unprime registers 20, prime registers 22, and memory stack 50 can be simply and efficiently controlled by use of status bits FO 26, FF 28, and CF 30.

Figure 3A:
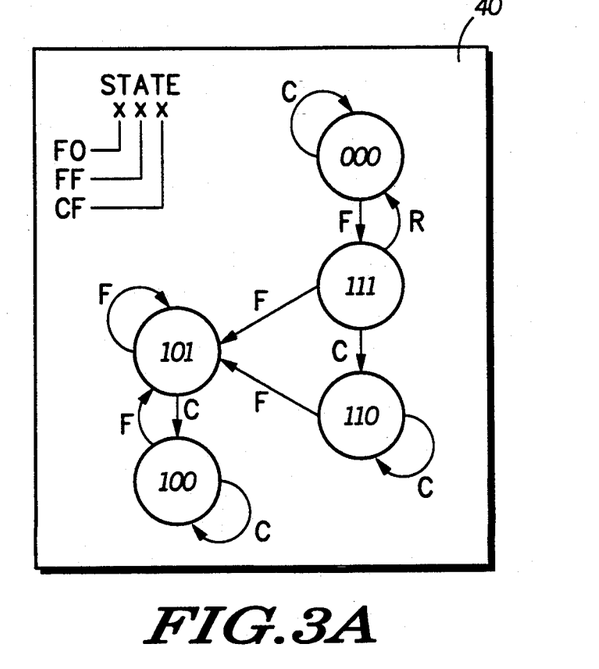
FIGS. 3A and 3B are state diagrams using status bits to distinguish the various states and representing two possible ways in which the digital data processor can handle interrupt processing and avoid recursion jeopardy.
Figure 3B:
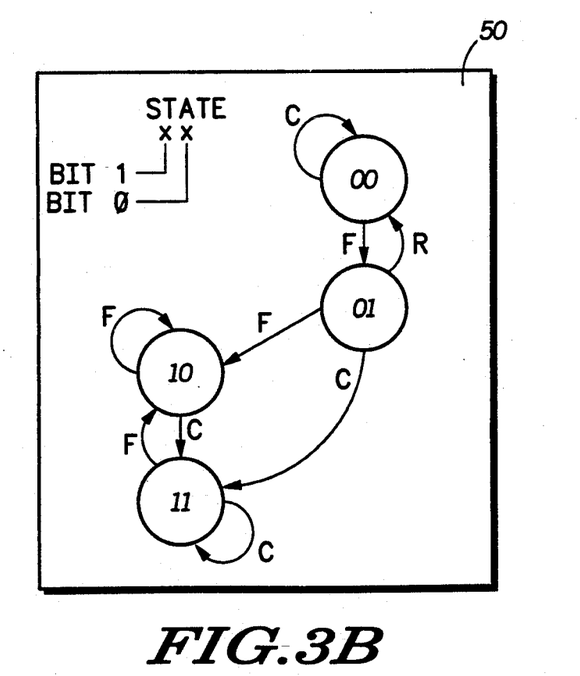

Referring to FIGS. 3A and 3B, these figures are two possible state diagram representations for the status bits which can be used to handle recursion jeopardy. FIG. 3A is a state diagram 40 of the preferred embodiment which utilizes an FO status bit 26, an FF status bit 28, and a CF status bit 30 as described in this specification. An arrow represents the occurrence of an interrupt. When the processing of that particular interrupt is completed, the status bits for the prior interrupt are restored and thus the CPU 14 returns to its prior state.

State "000" represents the state in which no fast interrupts are in progress. State "111" represents the state in which only one fast interrupt has occurred and in which the most recent interrupt to occur was a fast interrupt. State "101" represents the state in which more than one fast interrupt has occurred and in which the most recent interrupt to occur was a fast interrupt. State "110" represents the state in which only one fast interrupt has occurred and in which the most recent interrupt to occur was a conventional interrupt. State "100" represents the state in which more than one fast interrupt has occurred and in which the most recent interrupt to occur was a conventional interrupt. These particular states and corresponding bit representations were chosen for the ease of software programming, but other states and other bit representations are also possible.

Referring to FIG. 3B, the state diagram 50 illustrates that it would also be possible to handle recursion jeopardy using as few as two status bits. Coming out of reset, the two status bits would start in state "00". Conventional interrupts would not cause any change in the status bits, however a fast interrupt would change the value of the status bits to "01". Once in state "01", a fast interrupt would change the value of the status bits to "10", whereas a conventional interrupt would change the value of the status bits to "11". In state "10", a fast interrupt would not change the value of the status bits, but a conventional interrupt would change the value of the status bits to "11". In state "11", a conventional interrupt would not change the value of the status bits, but a fast interrupt would change the value of the status bits to "10". The CPU 14 hardware or the software programmer would always be able to tell whether or not there was recursion jeopardy, whether an interrupt was the first fast interrupt, and whether the most recent interrupt was a fast interrupt or a conventional interrupt by looking at the value of the two status bits. State "00" is the only state in which there is no recursion jeopardy for a fast interrupt. State "01" indicates that the present interrupt is the first fast interrupt. And states "01" and "10" are only for fast interrupts while state "00" and "11" are only for conventional interrupts.

This invention allows the implementation and use of resources which are subject to recursion jeopardy by providing a mechanism to decide: (1) when the recursion problems will occur, such that any further attempts to utilize the resource may be directed to a similar resource not subject to the recursive limitations; and (2) when there is recovery from the jeopardy of an immediate recursion problem, such that the resource which did have the potential of recursion problems may again be utilized. This allows the implementation of resources which, although subject to recursion jeopardy, provide a higher performance solution than the secondary resource which does not have the recursion jeopardy. Further, because of the present invention, apparatus may be structured such that the high performance resource has sufficient depth to provide an overall system performance enhancement, while still solving the more exceptional case of a recursion jeopardy.

While I have shown and described specific embodiments of the present invention, further modifications and improvements will occur to those skilled in the art. I desire it to be understood, therefore, that this invention is not limited to the particular forms shown and I intend in the appended claims to cover all modifications that do not depart from the spirit and scope of this invention.

We claim:

1. A digital data processor comprising:
   a bus;
   a first register set coupled to the bus;
   a second register set coupled to the bus;
   a first status bit coupled to the bus;
   a second status bit coupled to the bus;
   central processing unit means coupled to the bus for utilizing said first and second register sets one at a time;
   first interrupt receiving means coupled to the central processing unit and to a first interrupt request signal conductor for receiving interrupt requests of a first type;
   second interrupt receiving means coupled to the central processing unit and to a second interrupt request signal conductor for receiving interrupt requests of a second type;
   state determining means coupled to the first and second status bits and the first and second interrupt receiving means for determining, in response to receipt of an interrupt request by either the first or second interrupt receiving means, whether the interrupt request is of the first type or the second type, whether the first status bit is in a first state or a second state and whether the second status bit is in the first state or the second state; and
   register set selecting means coupled to the state determining means and to the central processing unit means for selecting, in response to receipt of an interrupt request by either the first or second interrupt receiving means, one of the first and second register sets for utilization by the central processing unit means, the selection by the register set selecting means is dependent upon determinations of the state determining means.

2. A digital data processor according to claim 1 further comprising:
   next state determining means coupled to the first and second status bits and the first and second interrupt receiving means for determining, in response to receipt of an interrupt request by either the first or second interrupt receiving means, new values of the first and second status bits.

3. A digital data processor according to claim 2 further comprising:
   a first control bit coupled to the bus and to the register set selecting means, a state of the first control bit indicates which of the first and second register sets is presently being utilized by the central processing unit means and the central processing unit means is capable of determining the state of the first control bit independent of the register set selecting means.

4. A digital data processor according to claim 2 wherein the states of the first and second status bits, taken together, indicate one of:
   that no interrupt request of the second type has been received that has not been completed;
   that only one interrupt request of the second type has been received and that a most recent interrupt request received was of the second type;
   that more than one interrupt request of the second type has been received and that a most recent interrupt request received was of the second type; and
   that at least one of the second type of interrupt request has been received and that a most recent interrupt request received was of the first type.

5. A digital data processor according to claim 2 further comprising:
   a third status bit coupled to the bus; and
   wherein the first, second and third status bits, taken together, indicate one of: that no interrupt request of the second type has been received that has not been completed;
   that only one interrupt request of the second type has been received and that a most recent interrupt request received was of the second type;
   that more than one interrupt request of the second type has been received and that a most recent interrupt request received was of the second type; and
   that at least one of the second type of interrupt request has been received and that a most recent interrupt request received was of the first type.

6. A digital data processor according to claim 5 wherein the first status bit, if in the first state, indicates:
   that no interrupt request of the second type has been received that has not been completed.

7. A digital data processor according to claim 5 wherein the second status bit, if in the second state, indicates:
   that only one interrupt request of the second type has been received and that a most recent interrupt request received was of the second type.

8. A digital data processor according to claim 5 wherein the third status bit, if in the second state, indicates:
   that a most recent interrupt request received and not completed was of the second type.

9. A digital data processor comprising:
   a bus;
   a first register set coupled to the bus, the first register set further comprising:
   a first register subset; and a second register subset;
a second register set coupled to the bus, the second register set further comprising:
a third register subset; and
a fourth register subset;
a first status bit coupled to the bus;
a second status bit coupled to the bus;
central processing unit means coupled to the bus for utilizing said first and second register sets one at a time;
first interrupt receiving means coupled to the central processing unit and to a first interrupt request signal conductor for receiving interrupt requests of a first type;
second interrupt receiving means coupled to the central processing unit and to a second interrupt request signal conductor for receiving interrupt requests of a second type;
state determining means coupled to the first and second status bits and the first and second interrupt receiving means for determining, in response to receipt of an interrupt request by either the first or second interrupt receiving means, whether the interrupt request is of the first type or the second type, whether the first status bit is in a first state or a second state and whether the second status bit is in the first state or the second state; and
register set selecting means coupled to the state determining means and to the central processing unit means for selecting, in response to receipt of an interrupt request by either the first or second interrupt receiving means, one of the first and third register subsets and one of the second and fourth register subsets for utilization by the central processing unit means, the selection by the register set selecting means is dependent upon determinations of the state determining means.

10. A digital data processor according to claim 9 wherein the register set selection means always selects the third register subset after a first interrupt request of the second type has been received and before the first interrupt request of the second type has been completed.

11. A digital data processor according to claim 10 wherein the register set selection means always selects the fourth register subset while the central processing unit means is processing an interrupt request of the second type.

12. A digital data processor according to claim 11 further comprising:
next state determining means coupled to the first and second status bits and the first and second interrupt receiving means for determining, in response to receipt of an interrupt request by either the first or second interrupt receiving means, new values of the first and second status bits.

13. A digital data processor according to claim 12 further comprising: a first control bit coupled to the bus and to the register set selecting means, a state of the first control bit indicates which of the first and second register sets is presently being utilized by the central processing unit means, the central processing unit means is capable of determining the state of the first control bit independent of the register set selecting means.

14. A digital data processor according to claim 12 wherein the states of the first and second status bits, taken together, indicate one of:

that no interrupt request of the second type has been received that has not been completed;
that only one interrupt request of the second type has been received and that a most recent interrupt request received was of the second type;
that more than one interrupt request of the second type has been received and that a most recent interrupt request received was of the second type; and
that at least one of the second type of interrupt request has been received and that a most recent interrupt request received was of the first type.

15. A digital data processor according to claim 12 further comprising:
a third status bit coupled to the bus; and
wherein the first, second and third status bits, taken together, indicate one of:
that no interrupt request of the second type has been received that has not been completed;
that only one interrupt request of the second type has been received and that a most recent interrupt request received was of the second type;
that more than one interrupt request of the second type has been received and that a most recent interrupt request received was of the second type; and
that at least one of the second type of interrupt request has been received and that a most recent interrupt request received was of the first type.

16. A digital data processor according to claim 15 wherein the first status bit, if in the first state, indicates:
that no interrupt request of the second type has been received that has not been completed.

17. A digital data processor according to claim 15 wherein the second status bit, if in the second state, indicates:
that only one interrupt request of the second type has been received and that a most recent interrupt request received was of the second type.

18. A digital data processor according to claim 15 wherein the third status bit, if in the second state, indicates:
that a most recent interrupt request received and not completed was of the second type.

19. A method of operating a digital data processor comprising the steps of:
conducting non-interrupt processing utilizing a first register set;
receiving interrupt requests of a first type;
receiving interrupt requests of a second type;
conditionally halting said non-interrupt processing and beginning interrupt processing upon receipt of an interrupt request of the first type;
conditionally halting said non-interrupt processing and beginning interrupt processing upon receipt of an interrupt request of the second type;
setting and clearing first and second status bits dependent upon:
whether an interrupt request of the second type has been received and not completed; and
whether an interrupt request of the second type is presently being processed; and
selecting one of the first register set and an alternate register set upon beginning interrupt processing, a result of the step of selecting is dependent upon whether the beginning of interrupt processing was caused by an interrupt request of the first type or of the second type and upon states of the first and second status bits.

20. A method according to claim 19 further comprising the steps of:
setting and clearing the first and second status bits dependent upon:
whether an interrupt presently being processed is of the second type and is the only such interrupt request of the second type which has been received and not completed.

21. A method according to claim 20 wherein the step of selecting one of the first register set and the second register set further comprises the steps of:
selecting one of a first and third register subsets and one of a second and fourth register subsets.

22. A method according to claim 21 wherein the step of selecting one of the first register set and the second register set further comprises the step of:
always selecting the third register subset after a first interrupt request of the second type has been received and before the first interrupt request of the second type has been completed.

23. A method according to claim 21 wherein the step of selecting one of the first register set and the second register set further comprises the step of:
always selecting the fourth register subset while the central processing unit means is processing an interrupt request of the second type.

* * * * *